May 26, 1931.  B. P. IRVINE  1,806,974
TWO-ROW PULLING AND SIX-ROW PILING APPARATUS FOR HARVESTING SUGAR BEETS
Filed Feb. 21, 1930  3 Sheets-Sheet 1
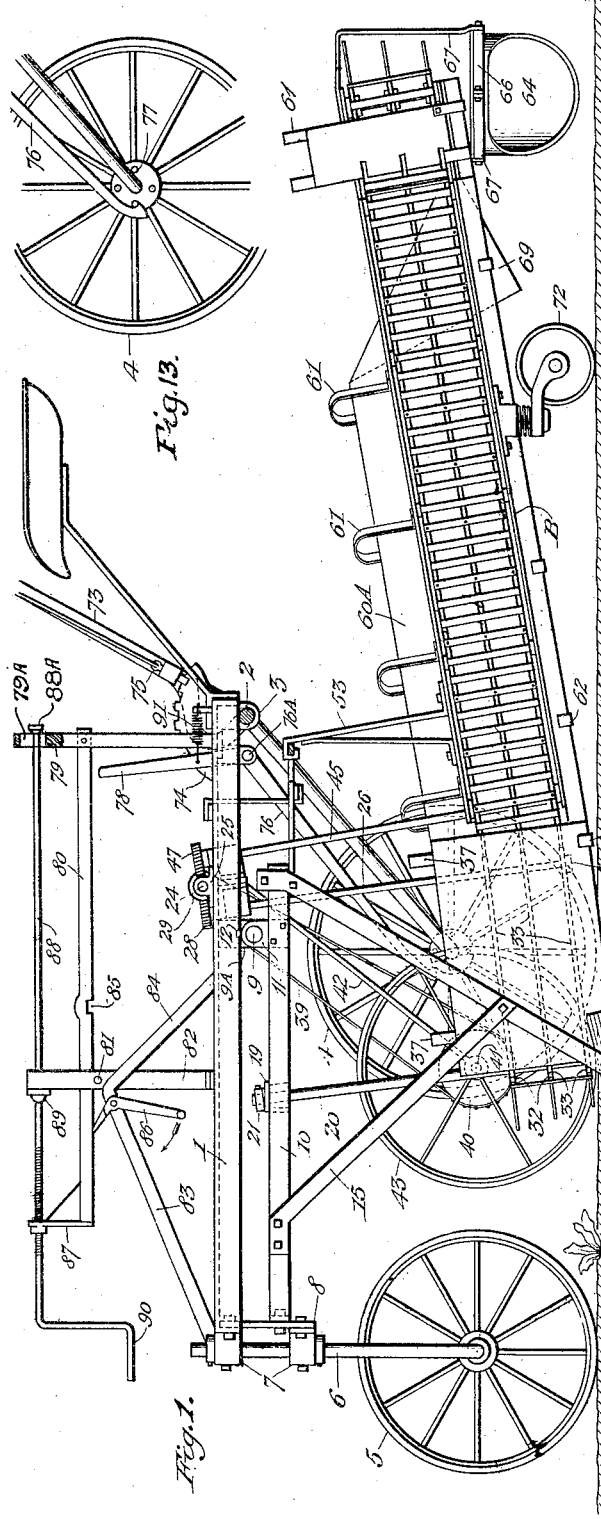
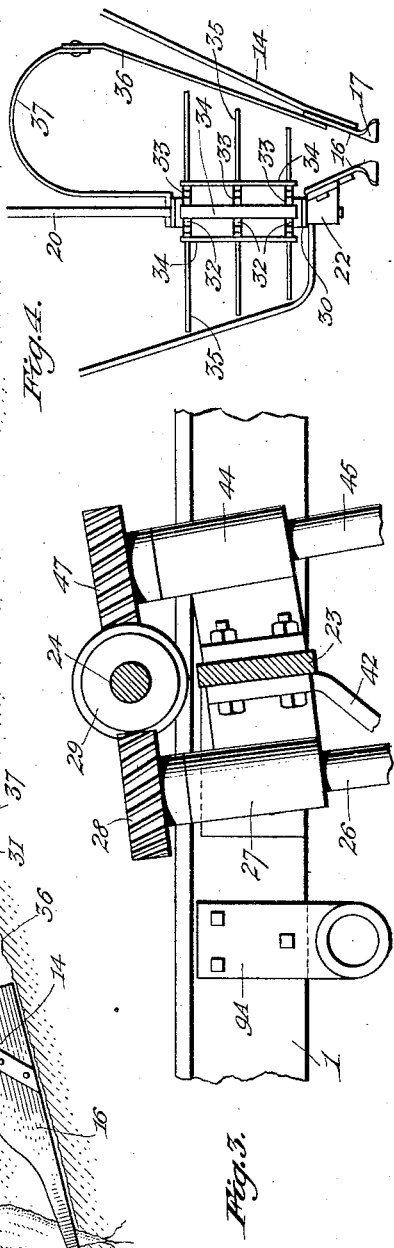
Inventor:
Benjamin P. Irvine.
By H. S. Bailey Attorney.

May 26, 1931. B. P. IRVINE 1,806,974
TWO-ROW PULLING AND SIX-ROW PILING APPARATUS FOR HARVESTING SUGAR BEETS
Filed Feb. 21, 1930 3 Sheets-Sheet 2
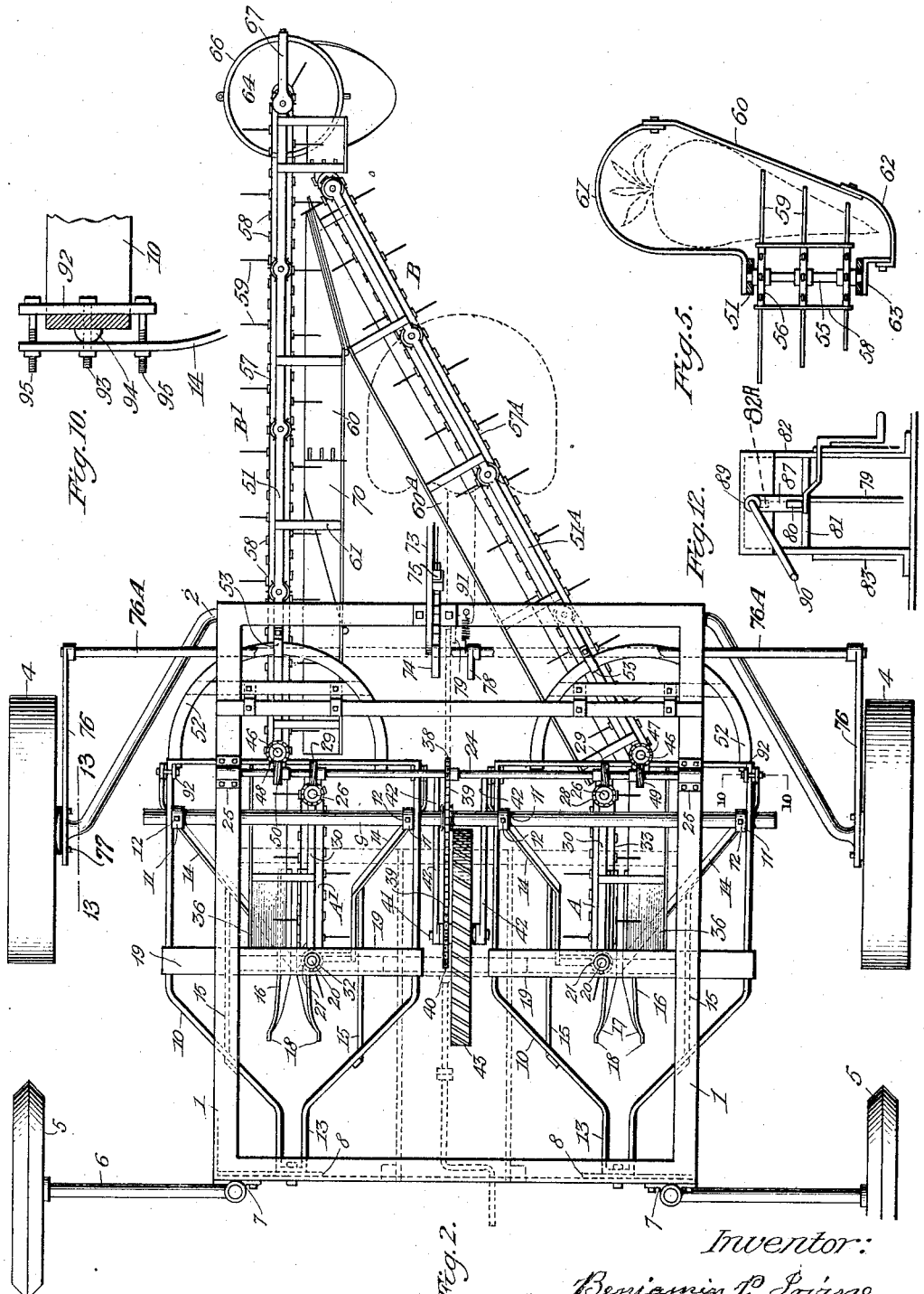

May 26, 1931. B. P. IRVINE 1,806,974
TWO-ROW PULLING AND SIX-ROW PILING APPARATUS FOR HARVESTING SUGAR BEETS
Filed Feb. 21, 1930 3 Sheets-Sheet 3
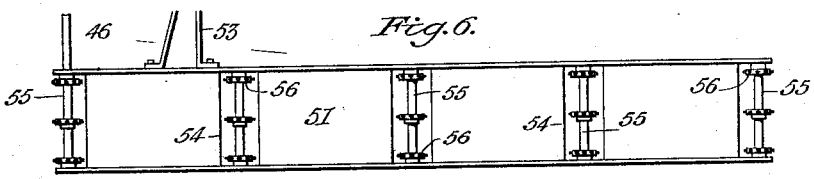
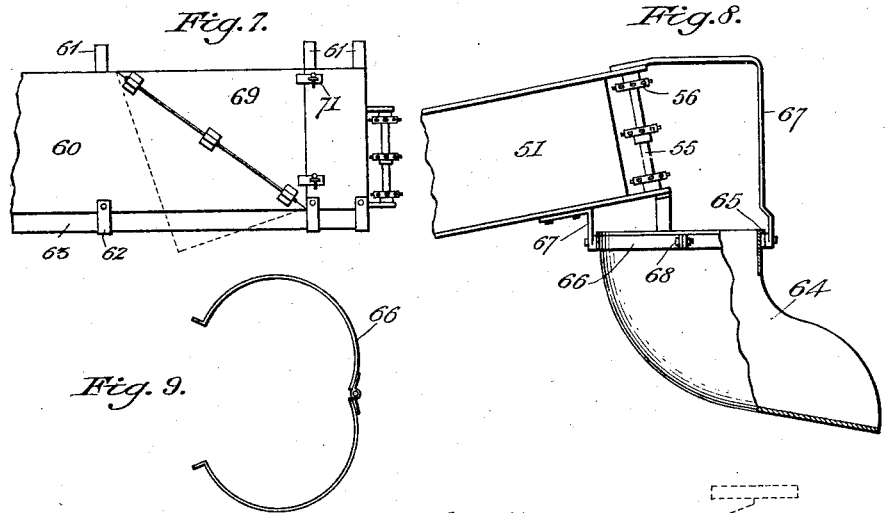
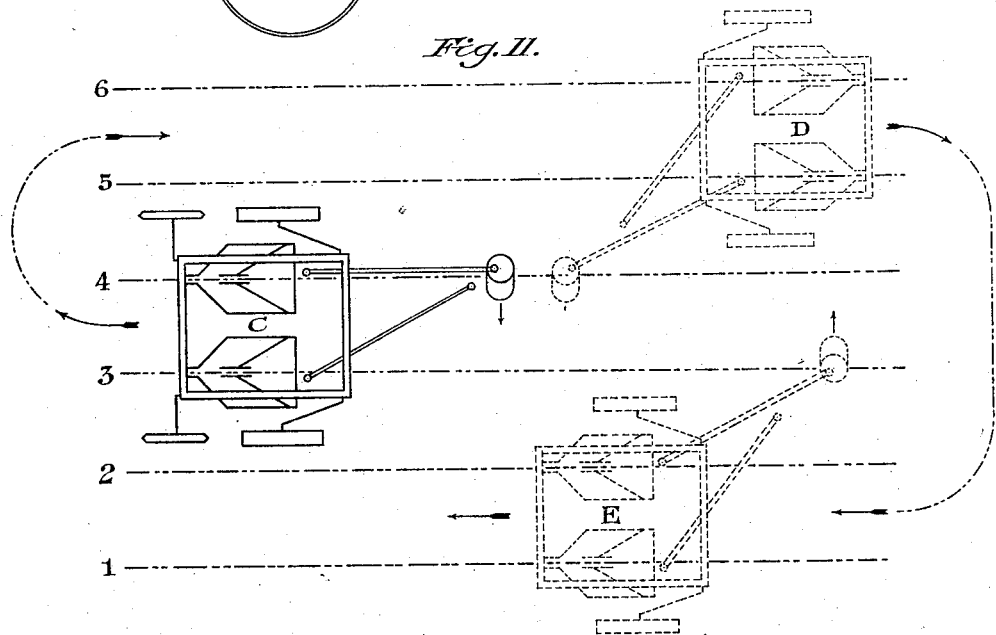
Inventor:
Benjamin P. Irvine.
By H. S. Bailey, Attorney.

Patented May 26, 1931

1,806,974

UNITED STATES PATENT OFFICE

BENJAMIN P. IRVINE, OF DENVER, COLORADO

TWO-ROW PULLING AND SIX-ROW PILING APPARATUS FOR HARVESTING SUGAR BEETS

Application filed February 21, 1930. Serial No. 430,250.

My invention relates to improvements in two row pulling and six row piling apparatus for harvesting sugar beets.

The primary object of the invention is to provide a beet harvesting apparatus which may be propelled by horse power, by a motor, or by a tractor, and which is adapted to pull two rows of beets at a time and for piling the beets of each six rows in a single row, thus eliminating a large percentage of hand labor in harvesting the beets.

Further, to provide an apparatus of this character comprising a wheel supported frame having a pair of beet pullers and co-operating conveyors which are adapted to receive the beets from the pullers and discharge them in a single row; the beets in the two middle rows of any six rows being first pulled and discharged in the space between the said middle rows, after which the fifth and six rows are pulled on the return trip, followed by the first and second rows, the conveyors being shifted laterally so as to discharge the beets from the fifth and sixth and first and second rows into the space between the two middle rows, thus forming a single pile row from each six rows of beets which are pulled.

Further, to provide means for tilting the frame to lift the pullers out of the ground and means for varying the depth of the pullers in the ground and for maintaining them at the required depth.

These and other objects which will hereinafter appear are accomplished by the apparatus set forth in the accompanying drawings in which, Fig. 1 is a side elevation of the improved beet harvesting apparatus.

Fig. 2 is a plan view thereof, parts being omitted for the sake of clearer illustration but shown in dotted lines.

Fig. 3 is a detail view-enlarged-showing the manner of operating the drive shafts for the conveyors.

Fig. 4 is a front view of a pair of the beet pullers and the short receiving conveyor connected therewith.

Fig. 5 is an end view of one of the long conveyors which receive the beets from the short conveyors.

Fig. 6 is a side view of one of the long conveyor supports showing the shafts mounted therein having sprocket wheels over which the conveyor chains pass.

Fig. 7 is a side view of the discharge end of one of the long conveyors showing a hinged door in the side thereof, which is opened to permit the other long conveyor to discharge therein when the said conveyors are arranged as shown in Fig. 2.

Fig. 8 is a side view-enlarged-of the discharge end of the frame of the conveyor shown in Fig. 7 showing a discharge chute connected therewith.

Fig. 9 is a top view of the two-part hinge connected ring which supports the discharge chute.

Fig. 10 is an enlarged detail sectional view on the line 10—10 of Fig. 2 showing the manner of effecting lateral adjustment of the arms which support the beet pullers.

Fig. 11 is a view in diagram showing the order in which each two rows of any six rows of beets are pulled and the arrangement of the conveyors by which all of the rows of beets are discharged in a single row between the two middle rows.

Fig. 12 is a detail end view of the mechanism for adjusting the main frame to vary the depth of the beet pullers.

Fig. 13 is a sectional view on line 13—13 of Fig. 2.

Referring to the accompanying drawings:—

The numeral 1 indicates a rectangular supporting frame upon the rear end of which is mounted an axle 2 in bearings 3 which are preferably secured to the under side of the frame. This axle has a swinging or rocking movement in its bearings and is substantially U-shaped in outline, its ends terminating in spindles to receive supporting wheels 4. When the axle is in the position shown in Fig. 1 the supporting frame is in a horizontal position and the beet pullers enter the ground, and when the axle is rocked in a manner to be later described, the frame is tilted and the pullers are withdrawn from the ground. The forward end of the frame is supported on wheels 5 which are mounted on L shaped axles 6, the vertical members of which are adjustably secured in pairs of supports or brackets 7, the upper bracket of each pair being bolted to the end of the frame and the lower bracket being bolted to a depending plate 8 which is bolted to the frame, as clearly shown in Fig. 1. The tread portions of the wheels 5 are preferably V-shaped in cross section so as to cut into the ground and thus prevent swerving of the machine from a direct course. A stationary transverse shaft 9 is mounted in brackets 9A on the under sides of the side members of the frame 1 and rear of the center of the said frame and extends a short distance beyond each side of the frame.

A pair of frames 10 are secured to the shaft 9 by brackets 11 which are secured to the side members of the frames near the rear ends thereof and are mounted on the said shaft which passes through holes in said brackets, the brackets being adjustable on the shaft and being held against movement by set screws 12. The frames 10 comprise parallel side members connected by a rear cross member, and the side members of each frame are bent to converge toward their front ends and terminate in short U-shaped portions 13, the ends of which are bolted to the plates 8. A pair of depending arms 14 are secured to the rear ends of the side members of each frame 10, and the arms of each pair converge toward their lower ends and also have a forward inclination, and brace bars 15 connect the arms 14 with the side members of the frames 10. Upon the lower ends of each pair of the arms 14 are secured beet pullers 16 which comprise parallel plates, which incline downwardly from their rear ends and also converge toward their bottom edges, a suitable space being left between the said lower edges. The front portions of the pullers are decreased in width and are flared or outwardly bent as shown at 17 and terminate in short parallel points 18. The side members of each frame 10 are connected by a bar 19 which rests upon the frame at the point where the side members begin to converge.

Conveyors are provided to receive the beets from each pair of pullers and as these conveyors are identical in construction, a description of one of them will suffice.

A depending shaft 20 projects at its upper end, through a hole in the bar 19 and is provided with a collar 21 which is secured thereto by a set screw and which rests upon the said bar thereby supporting the said shaft. The lower end of this shaft is supported in a bearing 22 which is secured upon the outer side of the inner beet puller blade 16, as clearly shown in Fig. 4. A cross bar 23 connects the side members of the main frame at a point above the rear ends of the frames 10 and just above the cross bar 23, is a shaft 24 which is supported at its ends in bearings 25 on the side members of the said main frame. A depending shaft 26 is supported at its upper end in a bearing 27 on the forward side of the bar 23, and the shaft projects above the bearing and has rigidly secured thereto a worm gear 28, which meshes with a worm pinion 29 on the shaft 24. The hub of the gear 28 rests upon the bearing 27, thus supporting the shaft 26, as shown in Fig. 3. The shaft 20 extends through the forward end of a short I-beam 30 which rests upon the bearing 22 on the beet puller blade and the shaft 26 passes through the rear end of this I beam and has a collar 31 on its lower end which supports this end of the said beam, this beam being similar to the beam shown in Fig. 6, only much shorter. Sprocket wheels 32, preferably three in number are secured upon the shaft 20 and between the upper and lower flanges of the I beam, as in the manner shown in Fig. 6 and these wheels are connected by endless sprocket chains 33. The chains 33 are connected by a series of spaced slats 34, and about every fourth slat is provided with three prongs or fingers 35 of progressively increasing lengths, the uppermost finger being the longest. These endless chains 33 with their slats 34 and fingers 35 constitute a conveyor A which extends from the rear portion of the beet pullers to a point a short distance back of the said pullers as most clearly shown in Fig. 1. The conveyors A receive the beets from the pullers 16, and carry them rearward, the beets being caught by the fingers 35 and held within the conveyor by a side plate 36 which is wider than the conveyor and is connected at its upper and lower edges to the I-beam 30 by strap irons 37, the front lower edge portion of the plate being also secured to the inner face of the adjacent puller blade, as shown in Figures 1 and 4. Upon the shaft 24, midway of its length, is rigidly secured a sprocket wheel 38 which is connected by a chain 39 with a driving sprocket 40 which is mounted on a shaft 41 which is mounted in the lower ends of arms 42, the upper ends of which are bolted to the cross bar 23. The shaft 41 has mounted thereon a traction wheel 43 to which is secured the driving sprocket 40, whereby rotation is imparted to the shaft 24 through the chain 39 and sprocket 38, so that the worm pinion 29 meshing with the worm gear 28 turns the shaft 26 and thereby operates the conveyor A. Cooperating with the conveyor A and the similar conveyor $A^1$ for the other pair of beet pullers, are long conveyors B and $B^1$ respectively, which are arranged in the following manner:—On the rear side of the cross bar 23 are bolted bearings 44 in which are mounted the upper end portion of depending shafts 45 and 46, which are provided with worm gears 47 and 48 respectively which are rigidly secured thereon and which mesh with worm pinions 49 and 50 which are rigidly secured upon the shaft 24. The lower end portion of the shaft 46 is mounted in the flange portions of the end of an I-beam 51 which forms the supporting member of the conveyor B¹. This end of the I-beam is supported from a semicircular track 52 the ends of which are bolted to the rear end of the main frame 1. A bracket 53 is bolted at its lower end to the said I-beam and the upper end of the said bracket has a right angled bend which engages the said semicircular track, thereby supporting the track and permitting the same to be swung upon its axis which is the depending shaft 46. Openings 54 are formed at intervals in the body of the I-beam to accommodate shafts 55 the ends of which are journaled in the flange members of the beam as will be understood by reference to Fig. 6 and each of these shafts is provided with three sprocket wheels 56. Endless sprocket chains 57 pass around the sprocket wheels on the end shafts 55 and over the sprocket wheels on the intermediate shafts, and the chains are connected by spaced slats 58, about every fourth slat being provided with prongs or fingers 59 the same as shown in connection with conveyors A and A¹. The conveyor B¹ is outside the line of the conveyor A¹ so that as the beets leave the conveyor A¹, they will be caught by the fingers of the conveyor B¹ as will be understood by reference to Fig. 2. The beets are held in the conveyor B¹ by a side plate 60 which extends the full length of the conveyor and is connected along its upper and lower edges to the I-beam 51 by strap irons 61 and 62 in the manner shown in Fig. 5, the strap irons 62 being secured at one end to an angle bar 63 which is secured to the under side of the I-beam, these strap irons being far enough below the conveyor to be out of the way of the lower ends of the beets as they are carried back by the conveyor. Upon the rear end of this conveyor is secured a beet-discharging chute 64 comprising a circular receiving end or mouth provided with a flanged rim 65, and a discharge spout which is semicircular in cross section. This chute is supported in a flat ring 66 made up of hinge-connected semi-circular members which are secured to the I-beam 51 by hangers 67 which are bolted to the said I-beam in the manner shown in Fig. 8. The flanged rim of the chute rests upon the upper edge of the ring, thus permitting the chute to be turned so as to discharge the beets of any six rows into one central row, as will be understood by reference to the diagram Fig. 11. The free ends of the ring members terminate in short right angled bends having bolt holes through which a bolt is passed to secure the ring in closed relation, the bolt being shown at 68 in Fig. 8. The side plate is provided with a door 69 near its rear end and with a similar door 70 near its middle—see Figures 2 and 7. These doors are triangular in shape, their lower edges being inclined as shown and their vertical edges are provided with hasps 71 which engage staples on the adjoining edge of the plate when the doors are closed, and are held by pins which pass through the staples as will be understood. The purpose of these doors will be later explained. The conveyor B which receives the beets from the beet puller conveyor A, cooperates with and discharges beets into the conveyor B¹ in the following manner:—This conveyor is similar to the conveyor B¹ and comprises the supporting frame or I-beam 51A which is constructed exactly as shown in Fig. 6, the endless conveyor 57A and a side plate 60A which runs the full length of the I-beam. The forward end of the I beam is pivotally mounted on the depending shaft 45 and this end of the shaft is supported by a bracket 53, the upper end of which hooks over a semicircular track 52 in the same manner as described in connection with conveyor B¹. The side plate 60A is on the inner side of the conveyor as shown in Fig. 2 and is not provided with doors but the rear end of this side plate is inclined or cut off at an angle, as shown in Fig. 1 and this permits the end of side plate 60A to engage and match the inclined edge of the rearmost doorway in the side plate 60 of the conveyor B¹ when the two conveyors are cooperatively arranged as shown in Fig. 2 in which arrangement the beets from the conveyor B discharge into the conveyor B¹ and the beets from both conveyors discharge from the chute 64 into the space between the two middle rows of any six rows. The rear end of the conveyor B may be secured to the conveyor B¹ in any suitable manner and the conveyor B¹ is provided with a spring cushioned caster wheel 72 which supports the rear end portions of both conveyors. When the apparatus is in beet-pulling position, the main frame is on a horizontal plane but the pullers may be lifted out of the ground so that the apparatus may be transported from place to place, either by a hand lever 73 which is connected to the horizontal part of the wheel shaft, in connection with the usual ratchet segment 74 and locking pawl 75, or the wheel shaft may be rocked in the following manner:—Arms 76 are pivotally connected at their upper ends to a shaft 76A on the main frame and at a short distance from the wheel shaft or axle and the lower ends of these arms are hook shaped and lie close to the inner faces of the hubs of the main supporting wheels 4. These hubs are provided with three or more projecting pins 77, anyone of which is adapted to be engaged by the hooked ends of the said arms which are normally out of the path of the pins but which may be swung by means of a hand lever 78 to bring them in position to be engaged by a pin when it is desired to lift the pullers out of the ground. This is done when the machine is moving forward and when the hooked ends of the arms engage the pins, the wheels 4 are locked against rotation and the shaft 2 will thus be rocked in its bearings, thereby swinging the wheels rearward and thus raising the rear end of the main frame and lifting the pullers out of the ground. The frame is locked in this position, in the following manner:—An upright arm 79 is rigidly connected at its lower end to the axle 2 and near its upper end it is pivotally attached to the rear end of a horizontal bar 80, the forward portion of which rests upon a horizontal pin 81 which is supported in an upright standard 82 which is mounted on the main frame and is braced by bars 83 and 84. The under edge of the bar 80 is provided with a notch 85 which engages the pin 81 when the bar swings forward and thus locks the axle 2 in its tilted position. A lever 86 is pivoted intermediate of its length to the brace bar 83, its upper end passing under the bar 80, and when the lever is swung in the direction of the arrow, the bar 80 is lifted, thereby releasing the same from the pin 81 and permitting the frame to drop to the position shown in Fig. 1.

The front end of the bar 80 is provided with an upright bracket 87 having a threaded hole to receive a threaded rod 88 which passes through a vertical slot 82A in the standard 82 and connects at its rear end to the upper end of the arm 79. The rod has a rigid abutment 89 which normally engages the standard 82 and thus defines the forward movement of the wheels 4, or in other words, maintaining the main frame in a horizontal position. The upper end of the arm 79, is slotted, as shown at 79A, and the end of the rod 88 is provided with a knob 88A which engages the slotted end of the bar 79, the slot 79A allowing relative sliding movement between the arm 79 and the rod 88, when the said rod is drawn upon.

The depth of the beet pullers in the ground may be varied by turning the rod 88 which draws on the arm 79, thereby rocking the axle and thus lifting the frame, the front end of the rod being in the form of a crank handle 90 for this purpose. The hooked ends of the arms 76 are normally held out of engagement with the pins 77 by a spring 91 which is connected at its ends to the hand lever 78 and the rear end member of the frame 1.

The front end of the main frame can be raised or lowered by vertical adjustment of the axles 6 in their bearings 7. Sugar beets are planted in rows which are twenty, twenty-two or twenty-four inches apart and so the frames 10 which support the beet pullers can be laterally adjusted on the shaft 9 by loosening the set screws 12 which clamp the supporting brackets 11 to the said shaft, and sliding the frames 10 to meet the required adjustment. The front ends of the frames 10, which are bolted to the plates 8 are also adjusted in a corresponding manner. The space between the beet puller blades may be increased or diminished in the following manner:—The arms 14 which carry the said beet pullers are connected to the side members of the frames 10 in such manner as to have a rocking adjustment and this is accomplished in the manner shown in Fig. 10, in which a vertical strip or plate 92 is secured to the inner face of the side bar of the frame 10 and is of greater length than the width of the side bar. A central bolt 93 passes through this plate and through the side bar and through a semicircular block 94 which rests against the outer face of the side bar, and through the arm 14 which rests against the said block. Bolts 95 also pass through the upper and lower ends of the plate 92 and through the arm 14 and by loosening the nut on one of the bolts 95 and tightening the nut on the other bolt 95, the arm 14 may be rocked on the block 94 which acts as a fulcrum and the puller blade on said arm is thereby moved inward or outward as the case may be.

In practical operation, the frames 10 which carry the beet pullers are adjusted laterally to space the two pairs of pullers a distance apart corresponding to the space between the rows of beets and the main frame is adjusted in the manner before described to cause the pullers to enter the ground to the required depth, each pair of pullers straddling a row of beets. As the machine advances, the beets are successively caught between the pairs of pullers and as the said pullers incline upwardly from their points to their rear ends and the pullers of each pair diverge from their lower edges, the beets will be lifted by engagement with pullers throughout the length of the pullers until they reach the short conveyors A and A¹ which carry them rearward and discharge them into the long conveyors B and B¹ respectively, which are arranged as shown in Fig. 2; the rearmost door 69 in the conveyor B¹ being open to permit the beets to discharge into the said conveyor B¹ from the conveyor B, while the other door 70 in the conveyor B¹ is closed. Thus, the beets from both conveyors are discharged into the chute 64 which discharges them in the space between the two completed rows. When the machine reaches the end of the first two rows which, for convenience will be termed the third and fourth rows, it is turned to the right and headed in the opposite direction and so that the two pairs of pullers will straddle the rows five and six respectively. The conveyor B¹ is then swung to one side or toward the fourth row and the chute 64 is turned in its bracket so as to discharge the beets in the space between the third and fourth rows; the door 69 in the conveyor B¹ is closed and the door 70 is opened and the conveyor B is then swung over so as to join the conveyor B¹ at the opening left by the door 70 as indicated by the dotted representation D in the diagram Fig. 11. As the machine advances, the beets from the fifth and sixth rows will be pulled and discharged in the space between the third and fourth rows and at the ends of the rows five and six the machine is turned to the right and heads in the opposite direction over the rows one and two, as indicated by the representation E in the diagram, the conveyors remaining in the same position, and as the machine advances, the beets from these rows are pulled and are also discharged into the space between rows three and four. Thus the beets from each six rows are pulled and are all discharged in a single row, thus eliminating a large percentage of hand labor in harvesting the beets.

It will thus be seen that the improved apparatus not only pulls two rows of beets at a time but its arrangement is such that the beets from each six rows are discharged in a single row, as indicated in Fig. 11 which shows the order in which the rows of beets are pulled and the arrangement of the conveyors for discharging the beets in a single row.

Having described my invention, what I claim as new and desire to secure by Letters Patent, is:—

1. In a two row beet puller and a six row beet piler, the combination with the wheeled frame of two pairs of beet puller blades straddling each of the two rows of beets and each blade of each pair of beet pullers being inclined inwardly to engage the downward tapering sides of the beets; endless conveyors supported on said frame and arranged to receive the beets from each pair of pullers, each pair of pullers being provided with a conveyor and the two conveyors being arranged to intersect each other at their discharging ends, each conveyor being provided with finger members arranged to engage the beets as they are pulled from the ground by the pullers and a chute at the end of the conveyors arranged to discharge the beets in the center of the space between the two inside rows of the six rows.

2. In a two row beet puller and a six row beet piler, the combination of a four wheeled supporting frame, means for raising or lowering the rear end of said frame above or below the center of the axle of the rear wheels, two pairs of beet plowing and pulling up blade members, each pair being arranged to straddle two adjacent rows and engage the beets therein and two independent endless conveyors provided with fingers arranged to engage each beet as it is pulled from the ground by the pullers and convey them to the rear of the puller and to discharge them into a chute that is arranged to discharge them upon the ground between the two rows of beets being pulled, and means for moving and operating the puller and piler to pull two rows at a time and to pile six rows of beets in one pile while pulling them.

3. In apparatus of the character described, a vertically adjustable wheel frame, pairs of beet pullers supported from said frame, each pair comprising spaced plates which incline downward from their rear ends and which diverge at their lower edges and terminate in flaring, pointed front ends, conveyors for receiving the beets from the pullers, conveyors having a swinging connection with the frame for receiving the beets from the first conveyors, one of said swinging conveyors being adapted to discharge into the other swinging conveyor, a chute pivotally attached to the said other swinging conveyor; a shaft on said frame, a drive traction wheel, a chain and sprocket connection between said traction wheel and said shaft and gearing connecting said shaft and all of said conveyors for operating them, the beets from each two rows being discharged in a single row.

4. In apparatus of the character described, the combination with a vertically adjustable wheel frame of a pair of laterally adjustable frames mounted thereon, beet pullers supported by each laterally adjustable frame, conveyors arranged to receive the beets from said pullers, conveyors for receiving the beets from the first conveyors, the latter conveyors having a swinging connection with the wheel frame, one of said swinging conveyors being arranged to discharge into the other swinging conveyor, a chute pivotally attached to the said other conveyor, a shaft on the wheel frame, a traction drive wheel supported on the wheel frame, a chain and sprocket connection between the traction drive wheel and said shaft, gearing connecting said shaft and all of said conveyors; means for supporting the rear ends of the swinging conveyors and a caster wheel on one of said swinging conveyors.

5. In a two row beet puller of the character described, the combination with a wheel frame, a pair of laterally adjustable frames on said wheel frame, beet pullers on said adjustable frames, endless conveyors for receiving the beets from said pullers, each of said conveyors having a driving shaft mounted at its upper end on the wheel frame, said upper ends having gear wheels thereon, a power shaft on said wheel frame, pinions thereon which mesh with said gears; a traction wheel on said wheel frame and a chain and sprocket connection between said wheel and said power shaft; conveyors for receiving beets from the first conveyors and having a swinging connection with the wheel frame, each of said swinging conveyors having a driving shaft mounted at its upper end on the wheel frame, said upper ends having gears secured thereon and pinions on the said power shaft in mesh with said gears, one of said swinging conveyors being adapted to discharge into the other, said other conveyor having a chute pivotally secured to its discharge end, said conveyors by their swinging connection being adapted to discharge the beets of any two, four or six rows in a single row.

6. In a two row beet puller of the character described, a wheel frame, beet pullers supported by said frame, conveyors for receiving the beets from the pullers, swinging conveyors for receiving the beets from the first conveyors, each conveyor comprising a longitudinal support, shafts mounted therein having sprocket wheels, each inner end shaft being a drive shaft, endless chains carried by said sprocket wheels and spaced slats secured to said chains having laterally extending fingers, the upper ends of said drive shafts being mounted on the wheel frame and having gear wheels secured thereon; a power shaft on the wheel frame having pinions in mesh with said gear wheels, a traction drive wheel on the wheel frame and a chain and sprocket connection between said drive wheel and said power shaft; longitudinal side plates on the swinging conveyors, openings in the side plate of one of said swinging conveyors to receive the discharge of the other swinging conveyor, in either of two positions of said conveyor, a pivoted chute on the end of the conveyor having the openings, and doors for said openings, the beets from each two rows of any six rows being discharged in a single row.

7. In a two row beet puller, a main frame, a U-shaped axle mounted on the rear end of said frame having spindle ends and supporting wheels on said spindles, means for rocking said axle to raise the rear end of said frame, front supporting wheels adjustably mounted on said frame, a stationary shaft on the under side of said frame, a pair of puller-supporting frames supported at their rear end on said stationary shaft and at their forward ends to depending members of said main frame, said puller frames being laterally adjustable, depending bars on said puller supporting frames and pullers on the ends of each pair of bars, said pullers comprising spaced cooperating plates which incline downward from their rear end and diverge from their bottom edges, their front ends being outwardly turned; conveyors for receiving beets from said pullers, swinging conveyors for receiving beets from the first conveyors, one of which discharges into the other; a pivoted chute on the said other conveyor, and means comprising a power traction wheel and mechanism operated thereby for operating said conveyors.

8. In a two row beet puller, the combination with a main frame and a U-shaped axle mounted on the rear portion of said frame and having supporting wheels on its ends; of means for rocking said axle and its wheels thereby to adjustably elevate the rear end of the said frame, comprising a lever arm extending from said axle the upper end of which is slotted, a standard on the said frame having a horizontal pin, a bar pivotally secured at one end to said lever arm and resting on said pin, a bracket on the other end of said bar having a threaded hole, a rod in threaded engagement with the threaded hole, one end of which passes through the slotted upper end of said lever arm and is provided with a knob, its opposite end terminating in a crank handle, a stop on said rod which engages said standard whereby when the rod is turned, the lever arm is drawn upon and the axle is rocked, frames laterally adjustable on the main frame, a pair of beet pullers supported on each adjustable frame, and conveyors for receiving the beets from each row and discharging them in a single row.

9. Mechanism according to claim 8 in which the said bar is provided on its under side with a notch to engage said pin to lock said bar at the limit of its forward movement and a hand lever on said standard to engage the under edge of said bar and disconnect the notch from the pin thereby to permit the frame to assume a horizontal position.

In testimony whereof, I affix my signature.

BENJAMIN P. IRVINE.